United States Patent [19]
Riley et al.

[11] Patent Number: 4,910,376
[45] Date of Patent: Mar. 20, 1990

[54] WELDING ELECTRODE ARRANGEMENT

[75] Inventors: David J. Riley, Chester; John Molyneus, Runcorn; Christopher O'Neil-Bell, Warrington; Stuart McLachlan, Northwich; Kenneth W. Brown, Cambridge, all of United Kingdom

[73] Assignee: Chloride Silent Power, Ltd., Cheshire, United Kingdom

[21] Appl. No.: 199,254

[22] PCT Filed: Sep. 21, 1987

[86] PCT No.: PCT/GB87/00661
§ 371 Date: Jul. 1, 1988
§ 102(e) Date: Aug. 1, 1988

[87] PCT Pub. No.: WO88/02296
PCT Pub. Date: Apr. 7, 1988

[30] Foreign Application Priority Data
Sep. 30, 1986 [GB] United Kingdom ............ 8623468

[51] Int. Cl.⁴ .................. B23K 35/02; B23K 11/30
[52] U.S. Cl. .................................. 219/119; 219/86.9

[58] Field of Search ............ 219/50, 75, 86.1, 86.25, 219/86.9, 119, 76.15, 138, 139

[56] References Cited
U.S. PATENT DOCUMENTS
3,089,947  5/1963  Früngel .................... 219/107
FOREIGN PATENT DOCUMENTS
924164  2/1955  Fed. Rep. of Germany .

Primary Examiner—A. D. Pellinen
Assistant Examiner—David Osborn
Attorney, Agent, or Firm—Finnegan, Henderson, Farabow, Garrett & Dunner

[57] ABSTRACT

A welding electrode arrangement comprising an inner electrode and a plurality of electrically interconnected outer electrodes defining a closed figure about the inner electrode, the outer electrodes being resilient in a direction substantially parallel to the axis of the closed figure, the outer electrodes further being in the form of a plurality of inwardly directed fingers extending from and integral with an outer connecting rim.

4 Claims, 2 Drawing Sheets

WELDING ELECTRODE ARRANGEMENT

BACKGROUND

1. Field of the Invention

This invention relates to welding, and in particular to a welding electrode arrangement for use in producing closed-figure, for example annular, welds.

2. Description of the Prior Art

It is sometimes required to weld one member in a hole in another member, a weld being produced about the periphery of the hole thereby to seal the hole with the one member therein.

Such a requirement exists in the manufacture of sodium sulphur cells as described in GB-A-2161017. In such cells a central current collector in the form of a metal rod extends through a hole in a metal washer mounted on a 'lid' of the cell, and it is necessary to weld the current collector in the hole in the washer to seal the hole.

Welding is effected by passing an electric current between the rod and the washer, and this is achieved by contacting the rod and the washer with mutually isolated electrodes connected to a source of welding current.

SUMMARY OF THE INVENTION

According to this invention there is provided a welding electrode arrangement comprising an inner electrode and a plurality of electrically interconnected outer electrodes defining a closed figure about the inner electrode, the outer electrodes being resilient axially of the closed figure.

The electrode arrangement of this invention has the advantage that in use it provides a substantially equal distribution of the welding current passing between the inner and outer electrodes, about the closed figure, and thus produces a substantially uniform weld about the closed figure.

The plurality of outer electrodes can be provided in the form of a plurality of separately formed members carried by a common body, in which case the inner electrode can extend through a hole in the common body to extend between the outer electrodes.

Otherwise the outer electrodes can be provided in the form of a plurality of inwardly directed finger extending from and integral with an outer connecting rim.

BRIEF DESCRIPTION OF THE DRAWINGS

This invention will now be described by way of example with reference to the diagrammatic drawings, in which.

DESCRIPTION OF THE PREFERRED EMBODIMENTS

Figure 1:
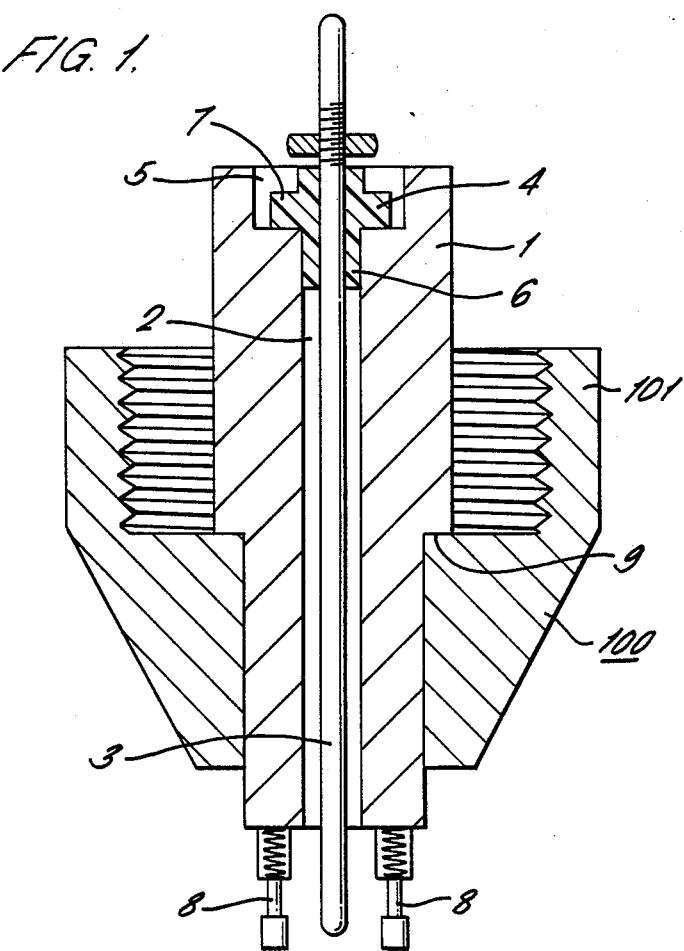
FIG. 1 is a sectional side elevational view of an electrode arrangement according to the invention.
Figure 2:
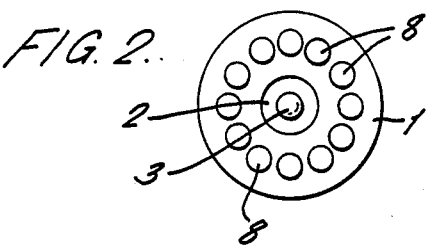
FIG. 2 is an end view of the arrangement of FIG. 1.

Referring to FIGS. 1 and 2, the electrode arrangement here shown comprises a cylindrical copper body 1 formed with an axial through hole 2. Extending through the hole 2 is an inner metal electrode 3 which is supported in electrically insulating manner on the body 1 by a plastics material, for example PTFE, insulator 4 received in a recess 5 in the body 1. The insulator 4 has a portion 6 which extends along the hole 2 between the wall thereof and the electrode 3, and a larger portion 7 which is received in the recess 5. Mounted on the free (lower as seen in FIG. 1) end of the body 1, arranged in a circle about the hole 2, are twelve, spring loaded outer brass electrodes 8, the spring loading of the electrodes 8 making them axially resilient. The free ends of the electrodes 8 define an annular closed figure, the inner electrode 3 extending along the axis of this figure. As shown in FIG. 1 the outer electrodes 8 extend beyond the free end of the inner electrode 3.

The electrode arrangement thus far described is mounted on the reminder of a welding gun (not shown) by means of a collett 100 which engages a forwardly facing shoulder 9 on the body 1 and has an internally threaded shroud portion 101 for engagement with the remainder of the gun. When the electrode arrangement is mounted on the gun the electrodes 3 and 8 will be connected in conventional manner to the terminals of the welding current source.

Figure 3:
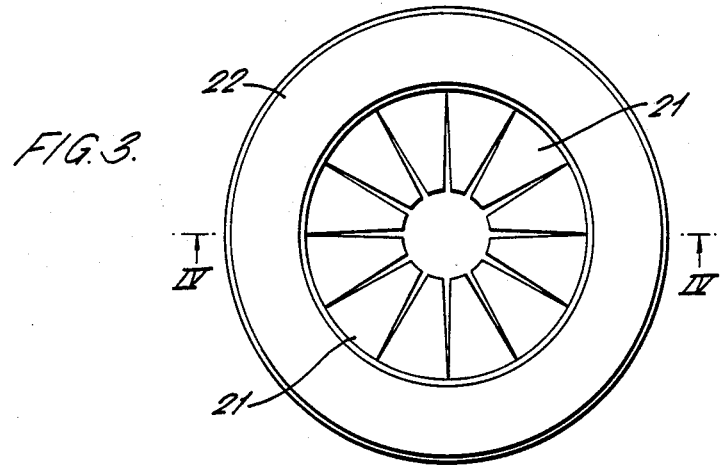
FIG. 3 is a plan view of part of a further electrode arrangement according to the invention.
Figure 4:
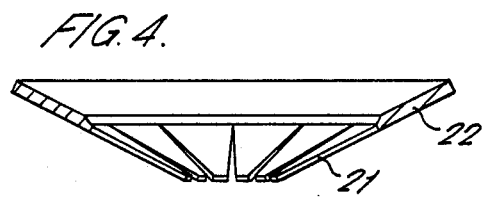
FIG. 4 is a sectional view on the line IV—IV in FIG. 3.
Figure 5:
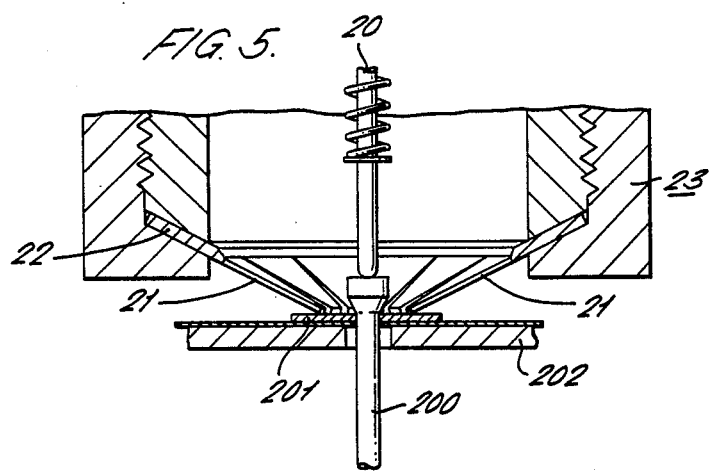
FIG. 5 is a side elevational view illustrating use of an arrangement including a part as shown in FIGS. 3 and 4 in manufacture of a sodium/sulphur cell.

Referring now to FIGS. 3, 4 and 5 the arrangement here shown comprises a spring loaded inner electrode 20 and a plurality of outer electrodes 21 provided in the form of twelve inwardly directed tapered fingers (21) extending from and integral with an outer annular connecting rim 22. As clearly shown in FIGS. 4 and 5, the fingers 21 and rim 22 define a truncated cone with the inner electrode 20 extending out at the apex thereof. The free ends of the fingers 21 define an annular closed figure, and are resilient axially of this closed figure. Further, each finger 21 is of reduced thickness relative to the rim 23. As shown in FIG. 5, the rim 22 is held in a collett arrangement 23 forming part of the remainder of the welding gun, and for use the electrode 20 and 21 will be connected in conventional manner to the terminals of the welding current source.

FIG. 5 illustrates the use of the electrode arrangement of FIGS. 3 to 5 in welding a current collector metal rod 200 in the hole in an annular metal washer 201 mounted on the cover 202 of a sodium/sulphur cell as described in GB-A-2161017. With the rod 200 located in the hole as shown the electrode arrangement is advanced such that the inner electrode 20 engages the end of the rod 200 and is pushed back against its spring bias until the outer electrode fingers 21 engage the washer 201 in a closed figure (a circle) about the rod 200. At this point the welding current (of say 1200 amps) is passed between the electrodes 20 and 21 through the rod 200 and washer 201 thereby welding the rod 200 in the hole in the washer 201.

The electrode arrangement shown in FIGS. 1 and 2 is used in similar manner save that the ring of outer electrodes 8 would engage the washer 201 before the inner electrode 3 engages the end of the rod 200.

Although in the arrangements described above the outer electrodes define an annular closed figure, it will be appreciated that the closed figure can be of any required shape.

We claim:

1. A welding electrode arrangement comprising an inner electrode and a plurality of electrically interconnected outer electrodes defining a closed figure about the inner electrode, the outer electrodes being resilient in a direction substantially parallel to the axis of the closed figure, wherein the outer electrodes are in the form of a plurality of inwardly directed fingers extending from and integral with an annular outer connecting rim.

2. An arrangement as claimed in claim 1, in which the fingers are of reduced thickness relative to the rim.

3. An arrangement as claimed in claim 1 in which the fingers and rim define a truncated cone.

4. An arrangement as claimed in claims 1 or 2, in which the fingers and rim define a truncated cone, and in which the inner electrode is spring loaded and extends between and beyond the free ends of the fingers.

* * * * *

UNITED STATES PATENT AND TRADEMARK OFFICE
CERTIFICATE OF CORRECTION

PATENT NO. : 4,910,376

DATED : March 20, 1990

INVENTOR(S) : Riley et al.

It is certified that error appears in the above-identified patent and that said Letters Patent is hereby corrected as shown below:

Column 4:

Claim 3, line 1, change "claim 1" to --claims 1 or 2--.

Signed and Sealed this

Twenty-third Day of July, 1991

Attest:

HARRY F. MANBECK, JR.

*Attesting Officer*   *Commissioner of Patents and Trademarks*